United States Patent [19]

Geldmacher

[11] Patent Number: 5,330,645
[45] Date of Patent: Jul. 19, 1994

[54] APPARATUS FOR CONTINUOUSLY SEPARATING SOLID AND LIQUID FRACTIONS OF A MIXTURE OF SOLID AND LIQUID FRACTIONS

[76] Inventor: Joachim Geldmacher, Heidnüchelsweg 20, D-5223 Nümbrecht, Fed. Rep. of Germany

[21] Appl. No.: 942,425

[22] Filed: Sep. 9, 1992

[30] Foreign Application Priority Data

Sep. 11, 1991 [DE] Fed. Rep. of Germany ....... 4130145
Aug. 5, 1992 [DE] Fed. Rep. of Germany ....... 4225818

[51] Int. Cl.⁵ .............................................. B01D 33/46
[52] U.S. Cl. ................................. 210/327; 210/334; 210/396; 210/397; 210/386
[58] Field of Search ............... 210/332, 334, 391, 393, 210/396, 397, 398, 327, 416.1, 386

[56] References Cited

U.S. PATENT DOCUMENTS

| | | | |
|---|---|---|---|
| 920,739 | 5/1909 | Hedges et al. | 210/398 |
| 1,649,581 | 11/1927 | Genter et al. | 210/396 |
| 2,460,280 | 2/1949 | Finney | 210/393 |
| 4,090,965 | 5/1978 | Fuchs | 210/391 |

FOREIGN PATENT DOCUMENTS

| | | | |
|---|---|---|---|
| 3614668 | 12/1986 | Fed. Rep. of Germany . | |
| 2162080 | 1/1986 | United Kingdom | 210/396 |

Primary Examiner—Matthew O. Savage
Attorney, Agent, or Firm—Darby & Darby

[57] ABSTRACT

Apparatus for continuously separating a solid fraction from a liquid fraction in a mixture of such fractions has a stationary cylindrical vessel which is filled with the mixture and confines a rotary carrier as well as a battery of parallel disc-shaped filters mounted on and rotating with the carrier. The filters define internal chambers for separated liquid fraction and have foraminous walls which flank the respective chambers and intercept the solid fraction. The intercepted solid fraction is removed by stationary devices having receptacles immersed in the mixture, defining internal compartments for solid fraction and carrying sealing elements which prevent penetration of mixture from the internal space of the vessel into the compartments. The separated liquid fraction is evacuated fom the vessel through a channel in the carrier, and the solid fraction is evacuated from the internal compartments by suction and/or mechanically. Each stationary device has one or more inlets which serve for advancement of intercepted solid fraction from the foraminous walls of the respective filters into the respective compartments, and each such inlet extends from the radially innermost portion to the radially outermost portion of the respective foraminous wall.

12 Claims, 6 Drawing Sheets

APPARATUS FOR CONTINUOUSLY SEPARATING SOLID AND LIQUID FRACTIONS OF A MIXTURE OF SOLID AND LIQUID FRACTIONS

BACKGROUND OF THE INVENTION

The invention relates to improvements in apparatus for separating solid and liquid fractions in a mixture of such fractions. More particularly, the invention relates to improvements in filtering apparatus which can continuously separate solid fractions (e.g., impurities) from liquid fractions in mixtures of solid and liquid fractions.

German patent application No. 36 14 688 A1 of Ragnegard (published Dec. 18, 1986) discloses a filtering apparatus wherein a cylindrical vessel confines a plurality of filters which are rotatable by a driven shaft and define internal chambers for the separated liquid fraction of a mixture in the vessel. The solid fraction is intercepted by the filters, and the thus intercepted solid fraction is removed and evacuated by devices which are installed in the vessel adjacent the external surfaces of foraminous portions of the filters. The lower half of the vessel contains a mixture of solid and liquid fractions, and such mixture is maintained at a pressure above the pressure in the chambers of the rotary filters so that the liquid fraction is induced to flow into the filters with attendant interception of solid fraction at the external surfaces of the filters. The devices which serve to evacuate the intercepted solid fraction are installed in the vessel above the upper level of the mixture of solid and liquid fractions. This is intended to simplify the expulsion or withdrawal of intercepted solid fraction from the interior of the vessel. The apparatus of Ragnegard exhibits the drawback that only a relatively small portion of each filter is used to segregate solid fraction from liquid fraction because the upper half of the vessel and hence the upper part of each filter in the vessel, is disposed at a level above the mixture of solid and liquid fractions. Therefore, and if the apparatus of Ragnegard is to be used to filter large quantities of a mixture of solid and liquid particles per unit of time, the dimensions of the vessel and of the filters must be increased accordingly. Alternatively, it is necessary to employ two or more relatively small filtering apparatus.

OBJECTS OF THE INVENTION

An object of the invention is to provide a filtering apparatus wherein relatively small filters can be utilized to continuously separate large quantities of solid and liquid fractions from a mixture of such fractions.

Another object of the invention is to provide an apparatus wherein the vessel for the filters can be filled with a mixture of solid and liquid fractions without affecting the ability of the apparatus to reliably evacuate large quantities of separated solid and liquid fractions.

A further object of the invention is to provide novel and improved filters for use in the above outlined apparatus.

An additional object of the invention is to provide novel and improved means for evacuating the liquid fraction from the vessel of the above outlined filtering apparatus.

Still another object of the invention is to provide novel and improved means for withdrawing the intercepted solid fraction from the interior of the vessel in the above outlined continuous filtering apparatus.

A further object of the invention is to provide the apparatus with novel and improved means for repeatedly cleaning the filters in the vessel as long as the apparatus is in use.

Another object of the invention is to provide the apparatus with novel and improved means for establishing requisite pressures in various portions of the filtering apparatus.

An additional object of the invention is to provide an apparatus which can be designed to remove solid fractions of selected size and/or shape and which can be adjusted to ensure more or less thorough cleaning or flushing of filters in actual use.

Still another object of the invention is to provide a novel and improved method of segregating large quantities of solid fraction from the liquid fraction out of a mixture of such fractions.

A further object of the invention is to provide a novel and improved method of cleaning the filters in a continuous filtering apparatus of the above outlined character.

An additional object of the invention is to provide the apparatus with novel and improved means for preventing uncontrolled escape of a mixture of solid and liquid fractions from the vessel.

Another object of the invention is to provide a novel and improved method of reusing the segregated liquid fraction of the mixture of solid and liquid fractions.

SUMMARY OF THE INVENTION

The invention is embodied in an apparatus for continuously filtering a mixture of a liquid fraction (e.g., water) and a solid fraction (e.g., impurities). The improved apparatus comprises a mixture-containing vessel, a driven elongated rotary carrier which is mounted in the vessel, a plurality of neighboring filters provided on and rotatable with the carrier and spaced apart from each other in the longitudinal direction of the carrier and each having at least one foraminous wall which intercepts the solid fraction but is permeable to the liquid fraction and at least one internal chamber for the liquid fraction adjacent the at least one wall, means for evacuating the liquid fraction from the chambers and for establishing a pressure differential between the mixture in the vessel and the chambers so that the liquid fraction of the mixture flows through the foraminous walls into the respective chambers but the solid fraction is intercepted by the walls, and means for removing the intercepted solid fraction from the walls including a plurality of stationary receptacles in the vessel, at least one for each of the walls and each having an internal compartment for the solid fraction, means for at least partially sealing the compartment from the mixture in the vessel and means for directing the intercepted solid fraction from the respective wall into the compartment.

Each filter can include a substantially disc-shaped body having two spaced apart foraminous walls extending substantially radially of the carrier, flanking the respective chamber and having radially innermost portions at the carrier and radially outermost portions remote from the carrier. The evacuating means preferably includes the carrier, and the directing means of each receptacle can include at least one inlet (e.g., in the form of an elongated slot) communicating with the respective compartment and extending at least substantially all the way between the radially innermost and radially outermost portions of the respective wall.

The carrier can be mounted for rotation about a substantially horizontal axis, and the walls can be disposed in substantially vertical planes. The receptacles are or can be at least partially submerged in the mixture within the vessel.

The vessel can comprise a cylindrical wall member which is at least substantially coaxial with and sepacedly surrounds the carrier, and two end wall members at the opposite axial ends of the cylindrical wall member. The carrier is sealingly journalled in at least one end wall member of such vessel.

Each filter can comprise a plurality of sectors each of which includes a portion of the respective wall or walls and a portion of the respective chamber.

The carrier is driven to rotate in a predetermined direction, and each wall of each filter has an external surface which is adjacent the respective receptacle and an internal surface adjacent the respective chamber. Each receptacle has a front part and a rear part (as seen in the direction of rotation of the carrier), and the sealing means can comprise rotary elements disposed at the front parts of the respective receptacles and having peripheral surfaces which contact the exposed surfaces of the respective walls. The rotary elements can be provided with conical peripheral surfaces, and the peripheral surfaces can be provided on elastomeric portions of the respective rotary elements.

Alternatively, the sealing means can comprise substantially strip-shaped sealing elements provided at the front parts of the respective receptacles. Each such sealing element can include a front portion which faces counter to the direction of rotation of the carrier and a lateral surface which defines with the adjacent external surface a clearance or gap narrowing in the direction of rotation of the carrier. Each such lateral surface has a rear portion which is remote from the respective front portion and sealingly engages the respective external surface. Each such sealing element can consist, at least in part, of an elastomeric material.

If the sealing means comprises the afore-discussed rotary elements, such sealing means preferably further comprises sealing or stripping elements disposed at the rear parts of the receptacles. Each stripping element has a sealing lip which confronts the front part of the respective receptacle and bears against the external surface of the adjacent foraminous wall to separate the intercepted solid fraction from the wall. At least the sealing lip of each stripping element can be made of an elastomeric material.

The sealing means can further comprise a first sealing zone provided on each filter between the carrier and the respective wall, and a second sealing zone which is spaced apart from the first sealing zone in the radial direction of the carrier and surrounds the respective wall. Such sealing means then further comprises first and second sealing units provided on each receptacle and respectively engaging the first and second sealing zones of the respective filter. At least one sealing unit on each receptacle can include a labyrinth seal.

At least two neighboring filters on the carrier can be provided with confronting foraminous walls, and the receptacles which are adjacent such confronting walls are preferably pivotable relative to the vessel and relative to the respective filters into engagement of their sealing means with the respective foraminous walls. The arrangement may be such that the receptacles which are adjacent the confronting walls of two neighboring filters are pivotable about a common axis (e.g., about an axis which extends substantially radially of the axis of rotation of the carrier), and the apparatus can comprise means for coupling such receptacles to each other.

The removing means can include means for pneumatically and/or mechanically withdrawing solid fractions from the compartments of the receptacles. The pneumatic removing means can include one or more suction generating devices, and the mechanical means can comprise one or more rotary feed screws or the like.

The means for rotating the rotary elements of the sealing means relative to the respective filters can comprise toothed racks on the filters (e.g., ring-shaped toothed racks which are installed radially inwardly of the respective foraminous walls) and pinions connected to the rotary elements of the sealing means and mating with the respective toothed racks.

If the sealing means comprises a rotary element and a stripping element on each receptacle of the removing means, the directing means can comprise an inlet which is disposed between each rotary element and the respective stripping element and communicates with the respective compartment.

The filters and the respective receptacles can define paths for the flow of some liquid fraction from the chambers into the respective compartments. This facilitates pneumatic and/or mechanical removal of separated solid fraction from the compartments of the receptacles.

The sealing means can comprise a pair of sealing or stripping elements at the rear part of each receptacle to engage the respective wall. The directing means of such apparatus can comprise an inlet between each pair of sealing or stripping elements to direct segregated solid fraction from the external surface of the respective foraminous wall toward and into the respective compartment. Such apparatus can further comprise means for injecting a liquid (e.g., liquid fraction which has been segregated from the solid fraction) into the inlets between pairs of sealing or stripping elements at the rear parts of the receptacles. Each injecting means can comprise a liquid-supplying manifold at each of the inlets and at least one nozzle which is connected with the manifold and serves to spray liquid into the respective inlet.

The means for supplying the mixture of solid and liquid fractions into the vessel is preferably designed to admit the mixture at an elevated pressure (namely at a pressure above that of the liquid fraction in the chambers of the rotary filters). The receptacles can extend substantially radially of the carrier and the supplying means can comprise pipes having discharge ends disposed in the vessel upstream of the receptacles (as seen in the direction of rotation of the carrier). The discharge ends of the pipes can extend substantially radially of the carrier and can be provided with outlets for admission of mixture into the vessel substantially counter to the direction of rotation of the carrier.

The means for establishing a pressure differential between the mixture in the vessel and the liquid fractions in the chambers of the filters can comprise one or more valves which serve to regulate the flow of liquid fraction in one or more channels provided in the carrier, communicating with the chambers of the filters and forming part of means for evacuating liquid fractions from the internal chambers of the filters.

Each section of a multi-section filter can comprise a frame for a portion of the respective wall. Each sector of a filter includes a portion of the respective chamber and can comprise means for dividing the respective chamber portion into a plurality of spaces (e.g., a first space adjacent the carrier and a second space radially outwardly of the first space). If the evacuating means for liquid fractions comprises one or more channels in the carrier, each sector of each filter can be provided with at least one first passage which connects one of the two spaces with the channel or channels of the carrier, and a second passage provided (at least in part) in the respective frame to connect the second space with the channel or channels in the carrier.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
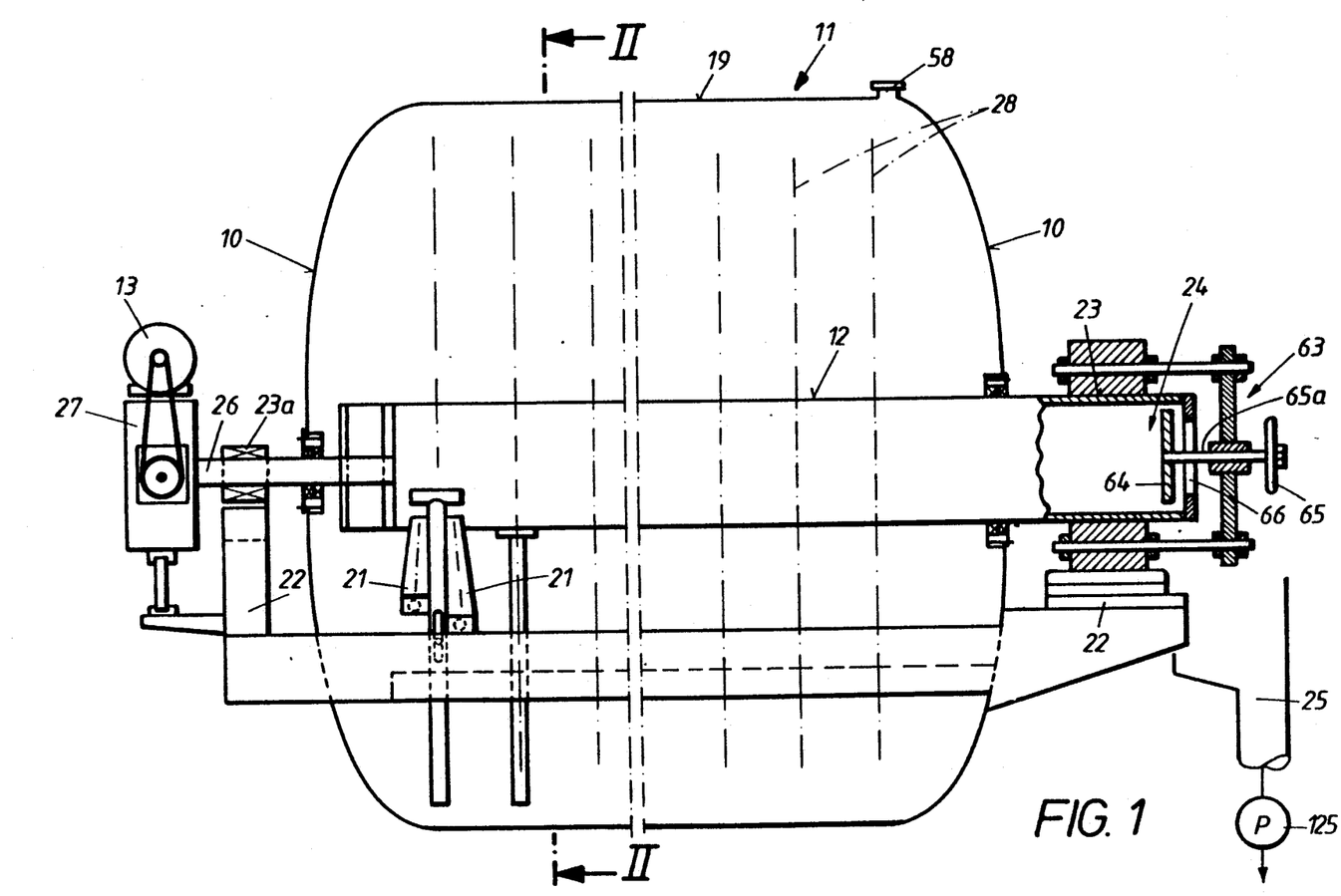
FIG. 1 is a partly elevational and partly central longitudinal vertical sectional view of an apparatus which embodies one form of the invention.

The apparatus which is shown in FIG. 1 is used for continuous filtering of a mixture of liquid and solid fractions, e.g., a mixture of water and solid impurities. The apparatus comprises a sealed vessel 11 which serves to receive and confine a mixture of solid and liquid fractions and includes a cylindrical wall member 19 between two end wall members 10. The horizontal axis of the cylindrical wall member 19 coincides with the axis of rotation of an elongated hollow carrier 12 which is rotatably and sealingly journalled in one end wall member 10 and carries a shaft 26 rotatably and sealingly journalled in the other end wall member 10. A closure 58 in the upper portion of the cylindrical wall member 19 can contain a relief valve which maintains the pressure of mixture in the vessel 11 at a desired value and/or a gauge serving to transmit signals denoting the pressure of mixture in the vessel. The mixture preferably fills the vessel 11 when the improved filtering apparatus is in use. The means for rotating the carrier 12 in a predetermined direction (note the arrow D in FIG. 2) comprises an electric motor 13 or another suitable prime mover which drives the shaft 26 through the medium of a variable-speed transmission 27 of any known design. The shaft 26 is non-rotatably connected with the respective end portion of the carrier 12.

Figures 2, 4:
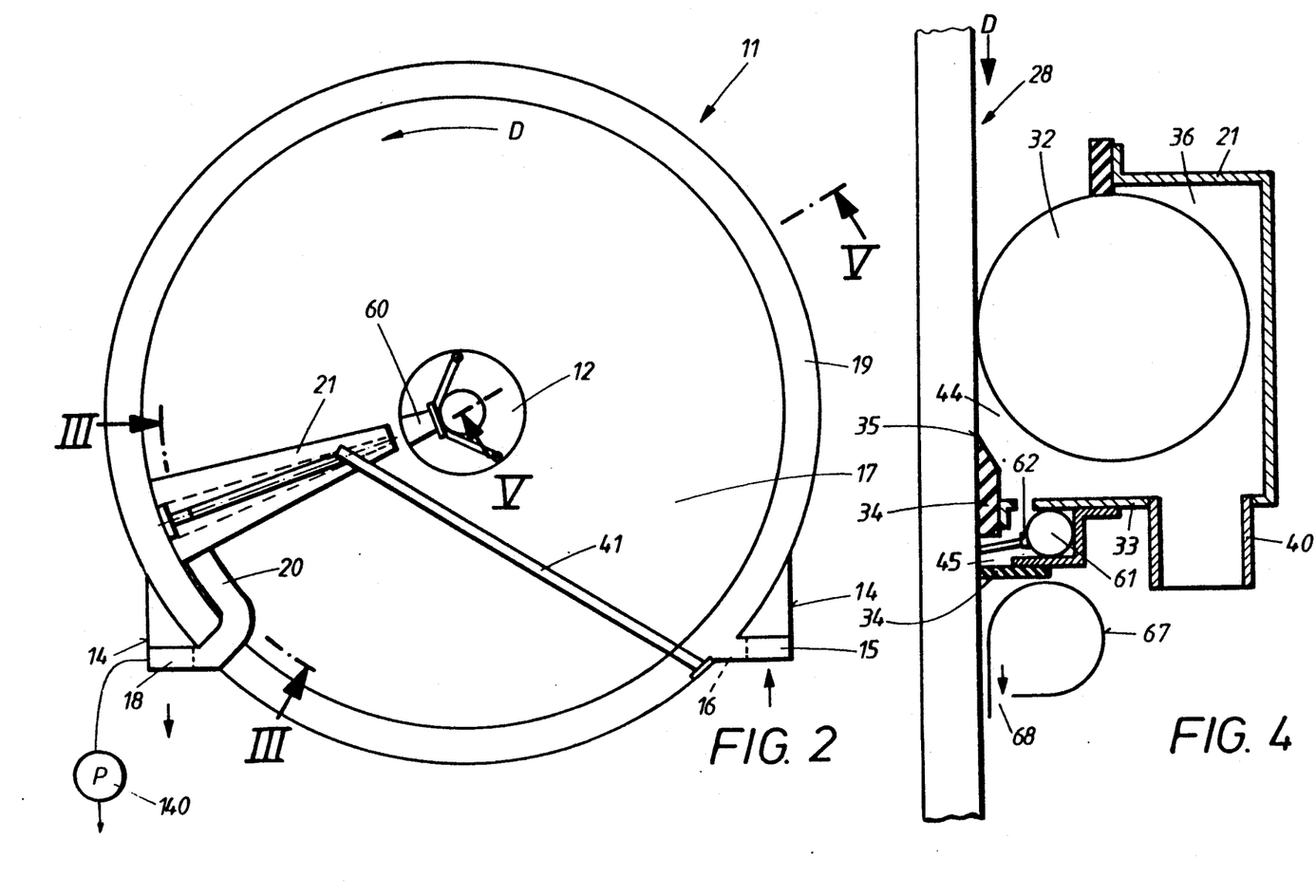
FIG. 2 is a schematic transverse vertical sectional view substantially as seen in the direction of arrows from the line II—II in FIG. 1.
FIG. 4 ms an enlarged sectional view of a modified receptacle which can be utilized in the improved filtering apparatus.

As can be seen in FIGS. 1 and 2, the cylindrical wall member 19 is rigid with two elongated hollow horizontal rails 14 or analogous supports which rest on a suitable base (not shown) and maintain the vessel 11 in a selected angular position. One of the rails 14 defines a channel 15 for admission of a mixture of solid and liquid fractions, such admission takes place through ports or slots 16 which connect the channel 15 with the internal space 17 of the vessel 11. The other rail 14 forms part of means for evacuating separated solid fraction from the interior of the vessel 11. To this end, the left-hand rail 14 of FIG. 2 defines a channel 18 for solid fraction, and this channel receives solid fraction from conduits 20 which, in turn, receive solid fraction from receptacles 21 which are non-rotatably installed in the internal space 17 of the vessel 11. The conduits 20 extend through the cylindrical wall member 19 of the vessel 11.

The end portions of the rails 14 extend beyond the two end wall members 10 of the vessel 11 and are connected to each other by two crossbeams 22. One of the beams 22 is provided with a bearing 23 for the hollow carrier 12, and the other beam 22 is provided with a bearing 23a for a shaft 26 of the carrier 12. The latter defines an elongated channel 24 forming part of means for evacuating the filtrate, i.e., the liquid fraction of the mixture which fills the internal space 17 of the vessel 11. The solid fraction is intercepted by the foraminous walls 51 of a plurality of parallel disc-shaped filters 28 which are installed in the vessel 11 and are mounted on and rotate with the carrier 12. If the axis of the carrier 12 is horizontal or nearly horizontal, the walls 51 of the filters 28 are preferably located in substantially vertical planes. The filters 28 are spaced apart from each other in the axial direction of the carrier 12.

A valve 63 is provided to establish a pressure differential between the mixture in the internal space 17 of the vessel 11 and the liquid fraction in the channel 24 as well as to control the rate of flow of liquid fraction from the channel 24 into a tank 25 or another suitable container for liquid fraction. A vacuum pump 125 or other suitable means can be provided to induce the flow of liquid fraction from the internal chambers 29 of the filters 28 into the channel 24 of the carrier 12 and thence through the valve 63 and into the tank 25.

The transmission 27 which supplies torque to the shaft 26 of the carrier 12 is mounted on the adjacent crossbeam 22 next to the bearing 23a for the shaft 26. The prime mover 13 can drive the shaft 26 (and hence the carrier 12 and the filters 28) at any one of two or more different speeds.

The valve 63 which is shown in FIG. 1 can be operated by hand. It comprises a wheel 65 on a threaded stem 65a which carries a disc-shaped valving element 64. The latter controls the rate of flow of liquid fraction from the channel 24 of the carrier 12 into the tank 25 through an outlet opening 66 in the adjacent end wall of the carrier 12. It is clear that this manually operated valve can be replaced with another manually operated valve or by a motor-driven valve which regulates the rate of flow of liquid fraction from the channel 24 in automatic response to signals from a pressure monitoring gauge (e.g., in the closure 58 for the vessel 11) to ensure that the pressure differential between the internal space 17 of the vessel 11 and the channel 24 is always maintained within an optimum range.

Each of the illustrated filters 28 comprises two spaced apart parallel washer-like foraminous walls 51 having external surfaces 31 which are contacted by the mixture in the vessel 11, and internal surfaces 31a which are adjacent the respective internal chamber 29 for liquid fraction. The solid fraction is intercepted by the external surfaces 31 of the walls 51. The aforementioned receptacles 21 form part of means for removing the intercepted solid fraction from the external surfaces 31 of the foraminous walls 51, and at least one such receptacle is adjacent each of the walls 51. Each receptacle 21 is fully submerged in the mixture which fills the internal space 17 of the vessel 11 and is admitted through the rail 14. The same applies for the filters 28, i.e., each such filter is also fully immersed in the mixture which fills the vessel 11. The pressure differential which is established by the valve 63 and pump 125, or in any other suitable way, ensures that the liquid fraction of the mixture which fills the internal space 17 of the vessel 11 flows through the foraminous walls 51 of the filters 28 in directions from the external surfaces 31 toward the internal surfaces 31a to enter the respective chambers 29 but the walls 51 intercept the solid fraction which gathers at the external surfaces 31 and is caused to enter the internal compartments 36 of the receptacles 21 and to be removed from the vessel 11 through the conduits 20 and the respective rail 14. The liquid fraction which gathers in the chambers 29 is caused to flow into the channel 24 of the carrier 12 to be evacuated into the tank 25.

The stationary receptacles 21 are adjacent the external surfaces 31 of the respective foraminous walls 51 and perform the additional function of preventing clogging of the interstices of the walls 51 by the constituents of the intercepted solid fraction. Thus, the external surfaces 31 of the walls 51 are relieved of the collected solid fraction once during each revolution of the carrier 12 so that the ability of the walls 51 to permit the flow of liquid fraction from the internal space 17 into the respective chambers 29 remains at least substantially unchanged for long periods of time. The prime mover 13 and/or the transmission 27 can be set to rotate the carrier 12 at a speed which is sufficiently high to ensure that the accumulations of intercepted solid fraction at the external surfaces 31 of the walls 51 during a full revolution of each filter 28 are not excessive, i.e., that the walls 51 are not prevented from permitting the liquid fraction to penetrate therethrough and into the respective chambers 29 during each stage of each revolution of the carrier 12. For example, the rotational speed of the carrier 12 can be selected as a function of the concentration of solid fraction in the mixture which fills the internal space 17 of the vessel 11.

The filters 28 may but need not be equidistant from each other in the axial direction of the carrier 12. As mentioned above, each filter 28 can resemble a hollow disc or wheel with two foraminous walls 51 disposed in parallel planes which are normal to the axis of rotation of the carrier 12.

The receptacles 21 are relatively small (see FIGS. 1 and 2) and preferably extend substantially radially of the carrier 12 in a direction from the axis of rotation of the carrier toward the internal surface of the cylindrical wall member 19 of the stationary vessel 11. Each receptacle 21 preferably extends all the way from the radially innermost portion of the adjacent filter 28 (close to the carrier 12) to the radially outermost portion of such filter (i.e., close to the cylindrical wall 19). This ensures that each and every increment of the external surface 31 of each wall 51 is compelled to sweep past the adjacent receptacle 21 during each and every revolution of the respective filter 28.

The receptacles 21 are provided with means for sealing their internal compartments 36 from the internal space 17 of the vessel 11 to thus prevent the flow of unfiltered mixture from the interior of the vessel directly into the receptacles. Each receptacle 21 is further provided with an inlet 44 and/or 45 serving as a means for directing the solid fraction from the external surface 31 of the adjacent foraminous wall 51 into the respective internal compartment 36. Each inlet preferably resembles an elongates slot which extends radially of the adjacent filter 28 and preferably all the way from the radially innermost portion to the radially outermost portion of the respective wall 51. Each inlet 44 or 45 is disposed between two sealing or stripping elements of the respective receptacle 21.

Figure 3:
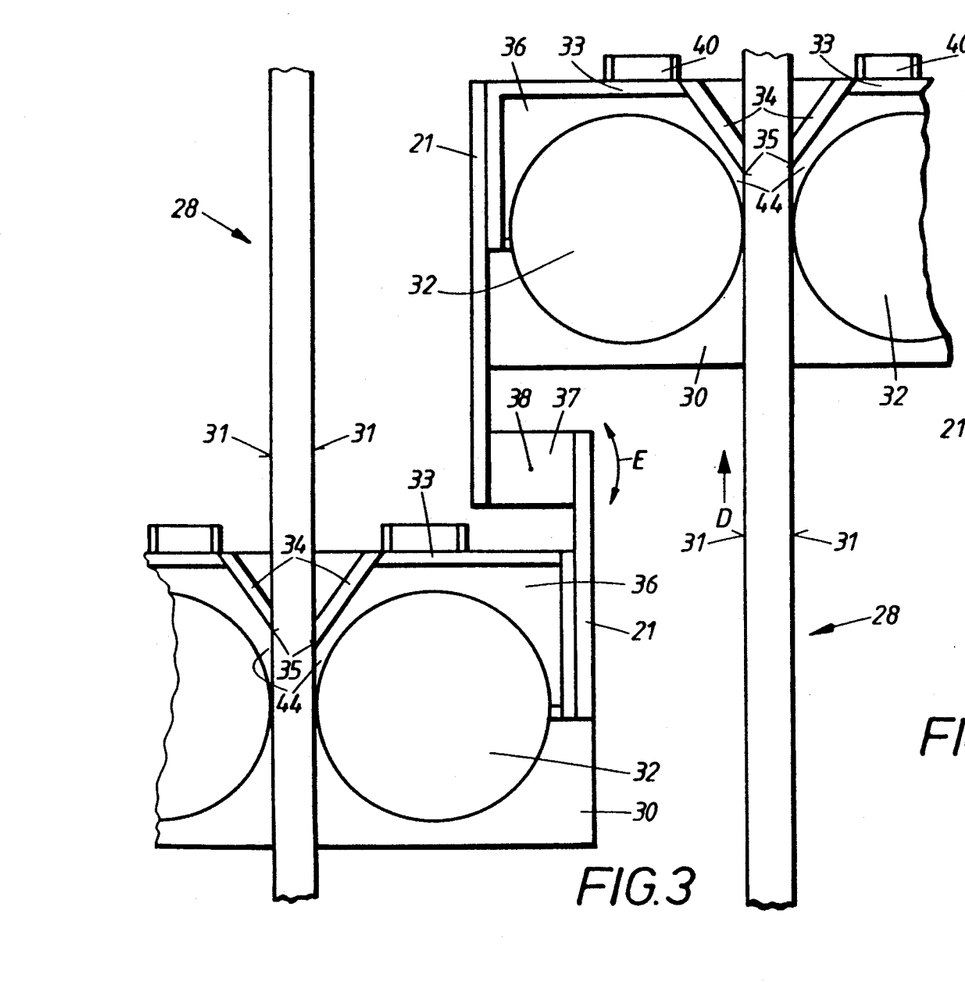
FIG. 3 ms an enlarged fragmentary sectional view substantially as seen in the direction of arrows from the line III—III in FIG. 2.

FIG. 3 shows four receptacles 21 each of which is adjacent a discrete foraminous wall 51. The two left-hand receptacles 21 of FIG. 3 are disposed at opposite sides of a first filter 28, and the other two receptacles 21 of FIG. 3 are located at opposite sides of a second filter 28. These four receptacles are identical and each thereof includes a front part 30 and a rear part 33 (as seen in the direction of arrow D which, as already mentioned above, indicates the direction of rotation of the carrier 12 and of the filters 28 in the internal space 17 of the vessel 11). The front part 30 of each receptacle 21 carries a rotary element 32 into form of an elongated slender cone which tapers in a direction toward the carrier 12 and has a peripheral surface in sealing engagement with the external surface 31 of the adjacent wall 51. Each of the rotary elements 32 (hereinafter called cones for short) performs a plurality of in part contradictory functions including sealingly engaging the adjacent external surface 31, urging the intercepted solid fraction against such external surface 31, promoting separation of intercepted solid fraction from the external surface 31, and constituting a boundary for the adjacent elongated slot-shaped inlet 44 which directs the solid fraction from the external surface 31 into the respective compartment 36. At least the outermost portion of each cone 32 is preferably made of a relatively soft elastomeric material such as rubber or a suitable synthetic plastic substance. This enables each cone 32 to sealingly engage the adjacent external surface 31 and to be maintained in at least slightly compressed state to ensure long-lasting sealing engagement with the adjacent foraminous wall 51. Compacting of intercepted solid fraction at the external surfaces 31 of the walls 51 is desirable and advantageous because this ensures expulsion of additional liquid fraction before the thus compacted solid fraction enters the adjacent inlet 44 or 45 for advancement into the respective internal compartment 36. Elasticity of the cones 32 (at least in the regions of their peripheral surfaces) enhances the ability of such cones to expel a rather high percentage of liquid fraction from the solid fraction which is intercepted at the external surfaces 31 of the adjacent foraminous walls 51.

The rear part 33 of each of the four receptacles 21 which are shown in FIG. 3 carries a stripping or sealing element 34 which is spaced apart from the peripheral surface of the respective cone 32 to define therewith the aforementioned inlet 44. The sealing or stripping elements 34 have lips 35 which face counter to the direction (arrow D) of rotation of the filters 28 and serve to strip the solid fraction off the external surfaces 31 and to direct the thus separated solid fraction into the respective inlets 44 or 45 for advancement into the compartments 36. At least the lips 35 of the elements 34 are preferably made of an elastomeric material, such as rubber or a suitable synthetic plastic substance.

It is preferred to mount the receptacles 21 in such a way that their rear parts 33 bear directly against and sealingly engage the external surfaces 31 of the respective walls 51. This further reduces the likelihood of penetration of unfiltered mixture from the internal space 17 of the vessel 11 directly into the compartments 36 of the receptacles 21.

The two receptacles 21 which are disposed in the space between the filters 28 of FIG. 3 are turnable (note the double-headed arrow E) relative to such filters and relative to the vessel 11 and carrier 12 about an axis extending substantially radially of the carrier. These receptacles are coupled to each other at 37 and 38 so that they can be pivoted about the common axis in order to increase or reduce the force which the rear parts 33, the sealing or stripping elements 34 and the cones 32 bear against the external surfaces 31 of the adjacent walls 51. The two receptacles 21 which are coupled to each other at 37, 38 (as shown in FIG, 3) are offset relative to each other in the circumferential direction of the adjacent filters 28, and the coupling means 37, 38 is disposed between such receptacles. The coupling means can include a sleeve 37 which is connected with the two receptacles 21 and a support 38 which defines a pivot axis for the sleeve 37 and is mounted on the cylindrical wall 19 of the vessel 11. The means for changing the angular positions of the two median receptacles 21 of FIG. 3 relative to the adjacent filters 28 can include a motor, a lever or other suitable means, not shown, which further serves to maintain the receptacles in a selected angular position relative to the adjacent filters 28. The receptacles 21 between the other filters 28 of the apparatus which embodies the structure of FIG. 3 can be mounted in a similar way. Thus, if the apparatus employs twelve parallel filters 28 each of which has two parallel foraminous walls 51, the means for removing the intercepted solid fraction can comprise eleven pairs of interconnected receptacles 21 of the type shown in the middle of FIG. 3 and two additional receptacles 21 at the outer sides of the two outermost filters 28.

Figure 12:
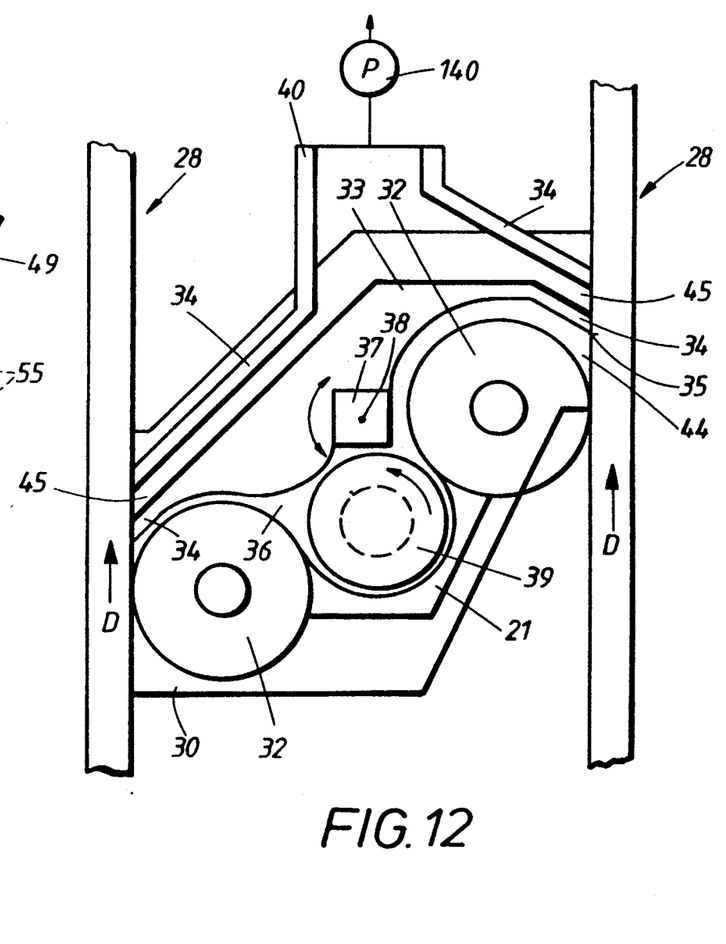
FIG. 12 illustrates a portion of a modified apparatus in a sectional view similar to that of FIG. 3.

The means for effecting or promoting withdrawal or expulsion of collected solid fraction from the compartments 36 of the receptacles 21 can comprise a pneumatic and/or a mechanical removing system. For example, a vacuum pump 140 (FIG. 2) or another suction generating device can be used to draw solid fraction through the conduits 20 which receive solid fraction from the compartments 36. Alternatively, or in addition to the pump 140, the means for effecting or promoting withdrawal of solid fraction can comprise a discrete feed screw 39 (FIG. 12) for each pair of receptacles between two neighboring filters 28. Each feed screw 39 can be driven by a discrete motor, not shown, or a single motor can be used to drive two or more feed screws. The receptacle 21 of FIG. 12 is a composite or twin receptacle with two cones 32, two pairs of stripping or sealing elements 34, a coupling device 37, 38 which serves to permit angular displacements of the composite receptacle 21 about an axis extending substantially radially of the carrier 12 and filters 28, and two inlets 45 each disposed between two neighboring elements 34 and each serving to direct intercepted solid fraction from the wall 51 of the respective filter 28 toward and into a composite internal compartment 36 having an outlet 40 for evacuation of solid fraction under the action of the motor-driven feed screw 39 and/or under the action of the vacuum pump 140. The outlet 40 of the composite receptacle 21 of FIG. 12 is connected to one of the conduits 20.

Figure 5:
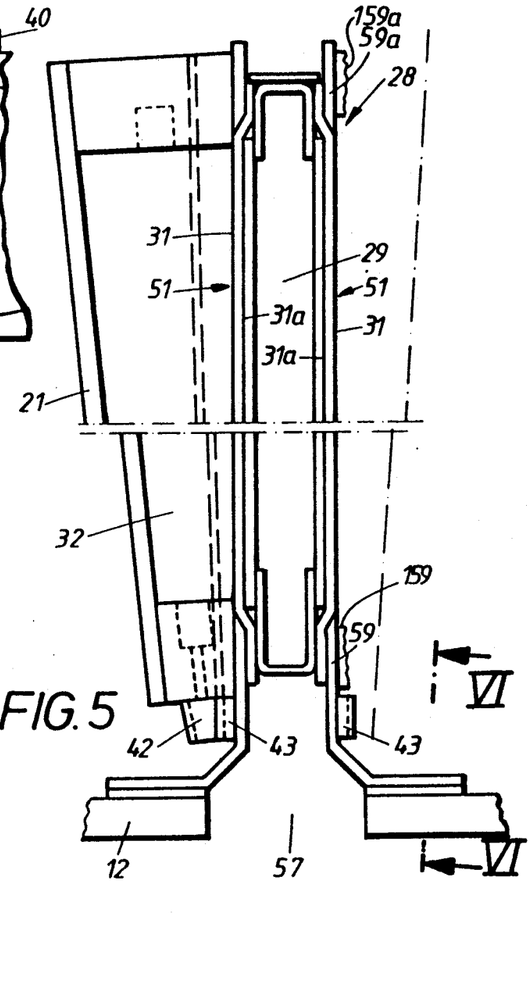
FIG. 5 is a sectional view substantially as seen in the direction of arrows from the line V—V in FIG, 2.

Referring to FIG. 5, the sealing means which prevents the flow of mixture from the internal space 17 of the vessel 11 into the compartments 36 of the receptacles 21 preferably further comprises a first or inner sealing zone 59 which is located radially inwardly of each wall 51 and is carried by the respective filter 28, and a second or outer sealing zone 59a which is provided radially outwardly of each wall 51. Each receptacle 21 has a first or inner sealing unit 159 which engages the adjacent first sealing zone 59 of the respective filter 28 and a second or outer sealing unit 159a which engages the second or outer sealing zone 59a of the respective filter 28. For example, each of the sealing units 159, 159a can include a substantially plate-like body with one or more labyrinth seals between the plate-like body and the respective sealing zone 59 or 59a. The sealing zones 59, 59a slide along the respective sealing units 159, 159a when the apparatus is in actual use, i.e., when the prime mover 13 drives the carrier 12 and the filters 28 relative to the receptacles 21.

In order to permit more convenient evacuation of solid fraction from the compartments 36 into the conduits 20 and thence out of the vessel 11, it is often advisable to mix the solid fraction in the compartments 36 with a certain amount of a suitable liquid, e.g., separated liquid fraction which has been evacuated from the chambers 29 through the channel 24 of the carrier 12 and has entered the tank 25. This can be seen in FIG. 4 which shows a liquid-supplying manifold 61 at the inlet 45 between two neighboring sealing or stripping elements 34. The manifold 61 carries one or more nozzles 62 having orifices which spray a liquid (e.g., liquid fraction drawn from the tank 25) into the inlet 45 so as to facilitate separation of intercepted solid fraction and the entry of such solid fraction (mixed with the liquid) into the compartment 36 of the respective receptacle 21. The outlet 40 of this receptacle can discharge the mixture of solid fraction and liquid by gravity flow and/or under the action of the vacuum pump 140.

The receptacles 21 can be mounted on the cylindrical wall member 19 of the vessel 11, and each individual receptacle 21 (e.g., a receptacle of the type shown in FIG. 4) or each pair of coupled-together receptacles 21 (FIG. 3) can be propped by an elongated rod-shaped member such as the member 41 which is shown in FIG. 2. The receptacle 21 which is shown in FIG. 2 is directly secured to the vessel 11 at or close to the nine o'clock position of the wall member 19 and is indirectly secured to the vessel by the rod-shaped member 41 which engages the wall member 19 at or close to the four o'clock position. The receptacles 21 may but need not form an annulus around the carrier 12.

The manner in which the cones 32 of the receptacles 21 can be rotated relative to the vessel 11 is illustrated in FIG. 5. The end portions of each cone 32 are rotatably journalled in the casings or housings of the respective receptacles 21 and one of these end portions carries a pinion 42 (e.g., in the form of a bevel gear adjacent the carrier 12). The filters 28 are provided with ring-shaped toothed racks 43 whose teeth mate with the teeth of the adjacent pinions 42 so that the cones 32 are set in rotary motion in automatic response to rotation of the filters 28 with the carrier 12. The illustrated rotary elements 32 are cones; however, it is within the purview of the invention to employ cylindrical rotary elements in lieu of or in combination with conical rotary elements. The ratio of the transmissions including the racks 43 and pinions 42 can be such that the peripheral surfaces of the cones 32 merely roll along the external surfaces 31 of the adjacent foraminous walls 51 or that the peripheral surfaces of the cones slide relative to the adjacent external surfaces 31 when the filtering apparatus is in actual use.

The width of the inlets 44 and/or 45 which are defined by the sealing elements of the receptacles 21 is sufficient to ensure predictable introduction of intercepted and compacted solid fraction into the respective compartments 36. The presently preferred mode of drawing solid fraction from the external surfaces 31 of the foraminous walls 51 into the respective compartments 36 is by suction (i.e., pneumatically); however, and as already described with reference to FIG. 12, it is equally within the purview of the invention to employ mechanical means including feed screws 39 or the like. Suction in the receptacles 21 is desirable and advantageous on the additional ground that successive increments of each wall 51 are automatically cleaned in that they are relieved of solid fraction during advancement along the respective inlets 44 and/or 45. The cleaning action is particularly satisfactory if the receptacles 21 are constructed in a manner as shown in FIGS. 4 and 12, i.e., with inlets 44 and 45 so that the vacuum pump or pumps 140 can ensure repeated thorough cleaning of each wall 51 during movement along the respective stationary receptacle 21. The lips 35 of the sealing or stripping elements 34 scrape the layers of intercepted solid fraction off the respective external surfaces 31 at the respective inlets 44, 45 to facilitate the propagation of solid fraction into the respective compartments 36 and thence into the respective conduits 20 through the outlets 40 of the respective receptacles 21.

It is equally possible to provide each receptacle 21 with a rotary sealing element 32 and with three or even more non-rotary stripping or sealing elements 34, i.e., to provide each receptacle with more than two inlets for admission of solid fraction into the respective compartments 36. A manifold 61 of the type shown in FIG. 4 can be provided in each inlet 44 and/or 45 or in a single inlet; each such manifold can carry an entire battery (e.g., one or more rows) of spray nozzles 62 or other suitable liquid dispersing and orienting means. The liquid which is discharged by the nozzle or nozzles 62 facilitates separation of solid fraction from the adjacent external surfaces 31 and simultaneously cleans the respective foraminous walls 51 so that they permit the flow of solid fraction into the chambers 29 at a highly predictable rate during each stage of revolution of each filter 28 when the increments of the walls 51 are not adjacent the respective receptacles 21.

Removal of solid fraction from the external surfaces 31 of the walls 51 can be enhanced by resorting to additional intercepting, scraping and/or analogous disengaging means. For example, if the nature of the mixture which fills the internal space 17 of the vessel 11 is such that the solid fraction tends to adhere to the external surfaces 31 with a considerable force, each receptacle 21 can be equipped with one or more rotary and/or stationary solids-removing members to prevent clogging of interstices of the walls 51. For example, rotary scraping members can be provided with suitably profiled peripheral surfaces to loosen the layers of solid fraction on the adjacent external surfaces. Stationary scrapers in the form of blades, wedges or the like can be used to loosen the afore-mentioned layers and to facilitate the task of the liquid sprays which are discharged by the nozzles 62 and/or the task of the pump or pumps 140 in compelling the intercepted solid fraction to become separated from the respective walls 51 and to enter the corresponding compartments 36. Once the strongly adhering layers of solid fraction are loosened by the aforediscussed rotary and/or stationary implements, the sprays of liquid which issue from the nozzles 62 and/or the pump or pumps 140 are capable of ensuring adequate cleaning of the walls 51 for renewed collection of solid fraction while the liquid fraction flows into the respective chambers 29.

Figures 6, 7, 13:
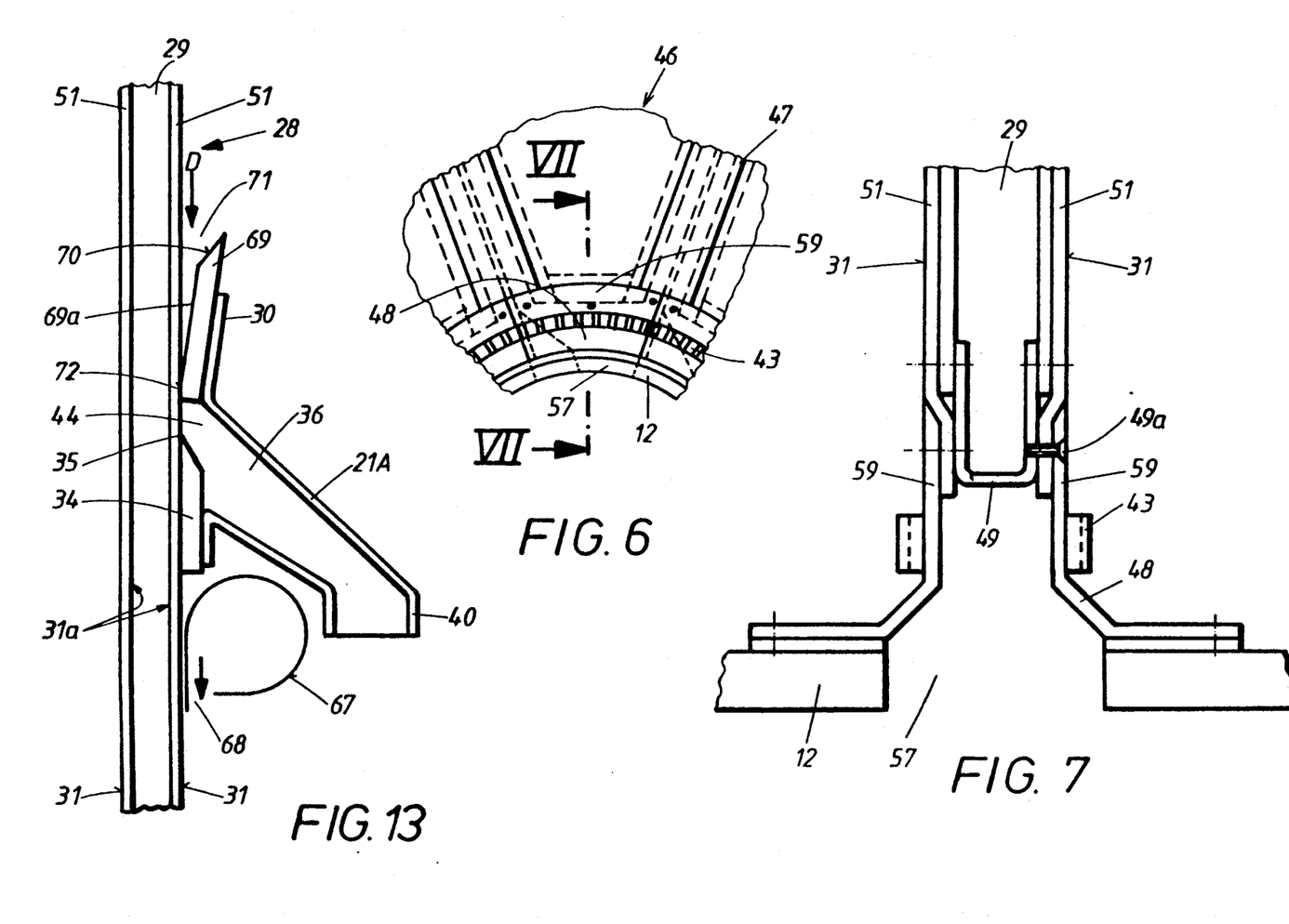
FIG. 6 is a greatly enlarged fragmentary sectional view substantially as seen in the direction of arrows from the line VI—VI in FIG. 5.
FIG. 7 is a sectional view substantially as seen in the direction of arrows from the line VII—VII in FIG. 6.
FIG. 13 is a fragmentary sectional view of a further filtering apparatus which employs modified receptacles for collection of the intercepted solid fraction.

FIG. 13 shows a modified receptacle 21A which does not employ a cone 32. The cone is replaced with an elongated strip-shaped sealing element 69 which is installed at the front part 30 of the receptacle 21A upstream of the sealing element 34 and inlet 44 (as seen in the direction of arrow D). The sealing element 69 has a front portion 70 which is spaced apart from the adjacent wall 51 to define with the external surface 31 of such wall a clearance or gap 71 which narrows in the direction of rotation of the filter 28. The clearance 71 extends between the adjacent external surface 31 and a lateral surface 69a of the sealing element 69. The rear portion 72 of the lateral surface 69a bears against the adjacent external surface 31 to expel liquid fraction from the layer of intercepted solid fraction on the adjacent external surface 31 before successive increments of the solid fraction reach the inlet 44 to be separated from the external surface 31 by the lip 35 of the sealing element 34 and/or by suction in the compartment 36.

FIG. 13 further shows the discharge end 67 of a pipe which serves to supply a mixture of solid and liquid fractions into the internal space of the vessel 11 downstream of the receptacle 21A. The outlet 68 of the discharge end 67 is orientated in such a way that the mixture flows along the adjacent external surface 31 in the direction of arrow D, i.e., away from the rear part of the receptacle 21A.

Figure 8:
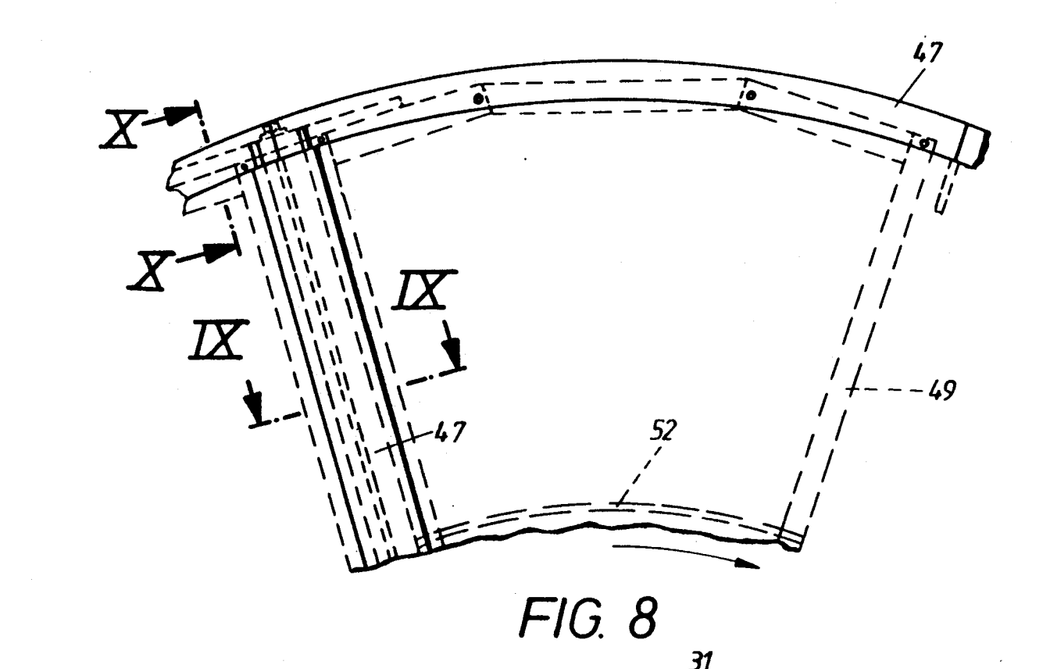
FIG. 8 is a fragmentary elevational view of a sector of a filter which can be utilized in the improved filtering apparatus.

Each filter 28 is preferably assembled of two or more sectors 46, e.g., of between two and ten sectors. Such sectors can be assembled into washer-like filters and each sector can be replaced independently of the other sector or sectors. Each sector 46 is inserted into a frame 47, and each such frame includes a radially innermost portion 48 (FIGS. 6 and 8) which is affixed to the carrier 12 by bolts or other suitable fasteners. The radially innermost portion 48 serves to establish a path for the flow of separated liquid fraction from the corresponding portion of a chamber 29 into the channel 24 of the carrier 12. The frames 47 are mounted on the carrier 12 and the sectors 46 are simply inserted into the respective frames 47.

Figure 9:
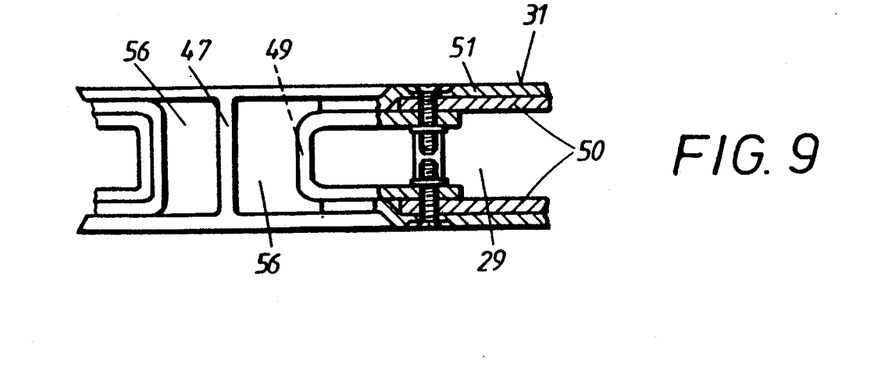
FIG. 9 is a sectional view substantially as seen in the direction of arrows from the line IX—IX in FIG. 8.
Figure 10:
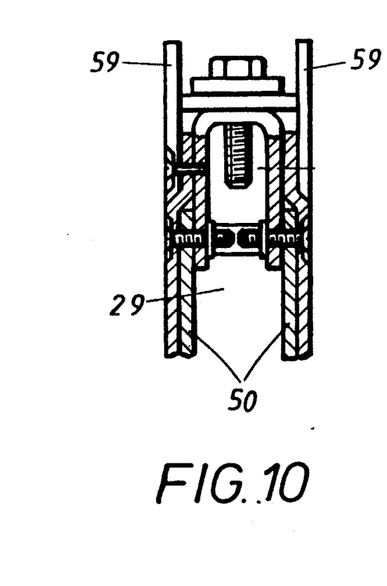
FIG. 10 is a sectional view substantially as seen in the direction of arrows from the line X—X in FIG. 8.

Each sector 46 comprises a frame 49 having a U-shaped profile and supporting the marginal portions of the respective sectors of the foraminous walls 51. Each foraminous wall 51 comprises the same number of sectors as the number of sectors 46 in a filter 28. Each frame 49 includes perforated legs 50 which are overlapped by the marginal portions of the sectors of the respective walls 51. As shown in FIG. 9, the connections between the legs 50 and the adjacent portions of sectors of the walls 51 can include bolts and nuts. The perforations of the legs 50 can be in the form of slots, and the material of the legs 50 can be bent inwardly around their slots to thus enhance the stability of the frame 49 and of the entire sector 46. The slot-shaped perforations in the legs 50 of the frames 49 can extend radially and/or circumferentially of the carrier 12. If the slots are formed by resorting to a stamping machine, such machine can simultaneously bend the material of the legs 50 around the slots in order to stabilize the frames 49 and the entire sectors 46.

Figure 11:
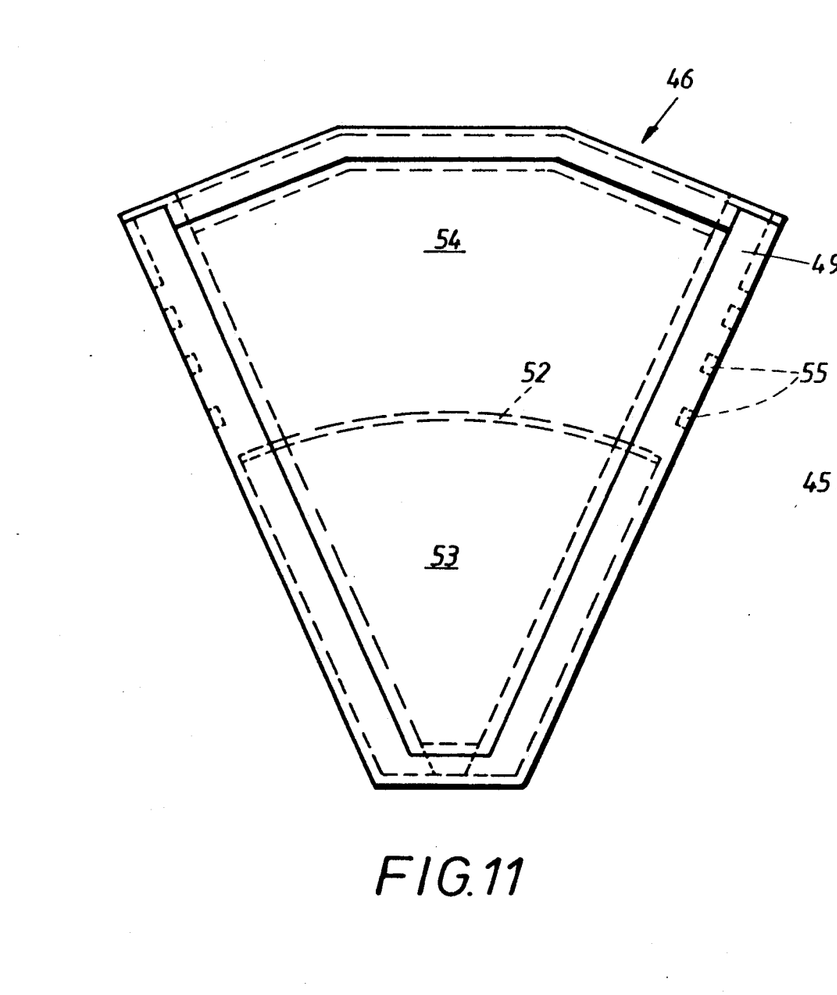
FIG. 11 is an elevational view of a sector which can be assembled with similar sectors to form a filter for use in the improved apparatus.

Each sector 46 is further provided with at least one partition 52 (FIGS. 6 and 11) which divides the chamber portion within such sector into an inner space 53 radially inwardly of the partition 52 and an outer space 54 more distant from the carrier 12. The space 53 communicates with the channel 24 of the carrier 12 through an outlet opening of the respective filter 28. The space 54 communicates with the channel 24 by way of one or more passages 55 (FIG. 11) which are provided at least in part in the frame 49. The passages 55 communicate with the respective outlet opening through one or more passages 56 which are defined by and are disposed between the frames 47 and 49 of the respective sector 46. The provision of separate paths for the evacuation of liquid fraction from the spaces 53 and 54 reduces the likelihood of 2 and two stripping elements 34 on the one hand, and damming of liquid fraction at the outlet of the radially inner space 53.

It is presently preferred to select the dimensions of the spaces 53, 54 in such a way that the area of that portion of a wall 51 which overlies the space 53 matches or at least approximates the area of the wall portion overlying the space 54.

The sealing action between the frames 47 and the respective filter sectors 46 is established by providing each frame 47 with suitably profiled extensions at opposite sides of the marginal portions of the sectors of the respective foraminous walls 51. This can be seen in FIG. 7 where the radially innermost portions of sectors of the two walls 51 are clamped between extensions and the respective legs of the frame 49. The clamping action is established by screws, bolts, rivets or other suitable fasteners one of which is shown in FIG. 7, as at 49a.

In addition to the channel 24, the carrier 12 can be provided with an elongated passage 60 (FIG. 2) which can extend all the way or nearly all the way between its ends and is defined by a pipe non-rotatably extending into the interior of the hollow carrier. The passage 60 contains pressurized filtrate (i.e., liquid fraction which has been separated from the solid fraction of the mixture of such fractions) and is located off center so that the pipe which defines this passage abuts and sealingly engages a portion of the internal surface of the carrier 12. Such portion of the pipe has openings (e.g., in the form of ports) which supply liquid fraction into the openings 57 leading to the portions of internal chambers 29 of the sectors 46 forming part of the filters 28. The openings in the pipe defining the passage 60 are oriented in such a way that they deliver filtrate to the chamber portions of those sectors 46 which happen to advance past the respective receptacles 21. This ensures that the portions of chambers 29 which move past the respective receptacles 21 cannot discharge filtrate into the channel 24 of the carrier 12. Such portions of the chambers 29 are then in communication with the passage 60 which contains pressurized filtrate. The pressurized filtrate cleans the corresponding sector-shaped portions of the foraminous walls 51 in that the filtrate flows in directions form the internal surfaces 31a toward and beyond the external surfaces 31 of such walls. This greatly reduces the likelihood of clogging of the walls 51 with solid fraction and renders it possible to operate the improved apparatus for long periods of time. Furthermore, the prime mover 13 can rotate the carrier 12 at an elevated speed. The means for non-rotatably mounting the pipe which defines the passage 60 in the hollow carrier 12 can include braces, guides, idler rollers and/or other suitable components (not shown).

The aforementioned closure 58 in the top portion of the cylindrical wall member 19 of the vessel 11 can define one or ore aerating ports to permit escape of air from the internal space 17, e.g., during initial filling of the space 17 with a mixture of solid and liquid fractions. As already mentioned hereinbefore, the closure 58 can also support one or more relief valves which open when the pressure in the internal space 17 rises to a maximum permissible level. For example, the mixture in the vessel 11 can be maintained at a pressure of between 1 and 5 bar. Furthermore, the closure 58 can be provided with the aforementioned gauge which transmits signals denoting the pressure of mixture in the internal space 17; such signals can be utilized to operate a motorized valve which replaces the valve 63 and regulates the pressure differential between the mixture in the space 17 and the liquid fraction or filtrate in the channel 24 of the carrier 12.

The aforediscussed pipes including discharge ends 67 with outlets 68 (as shown in FIG. 13) constitute but one form of means for supplying a mixture of solid and liquid fractions in the internal space 17 of the vessel 11. An advantage of the structure which is shown in FIG. 13 is that fresh mixture is admitted to flow against those portions of the foraminous walls 51 which have been subjected to a cleaning action during advancement past the respective receptacles 21. In other words, the outlets 68 admit a mixture of solid and liquid fractions against freshly cleaned increments of the walls 51. The means for supplying streams of mixture from the channel or channels 15 of the right-hand rail 14 of FIG. 2 into the discharge ends 67 can include passages or channels in the rod-shaped propping members 41 for the respective receptacles 21. Thus, each of the propping members 41 can constitute a pipe whose intake end receives a mixture of solid and liquid fractions from the respective port or ports 16 and whose discharge end 67 is adjacent the respective receptacle 21.

The provision of twin or composite receptacles 21 of the type shown between the filters 28 of FIG. 3 exhibits the advantage that the filtering apparatus can be assembled within a relatively short interval of time. Furhtermore, mere pivoting of such twin receptacles 21 (at 37, 38) renders it possible to simultaneously adjust the pressure between two cones 32 and two stripping elements 34 on the one hand, and two foraminous walls 51 on the other hand.

Pneumatic evacuation of intercepted solid fraction from the compartments 36 exhibits the advantage that the solid fraction can be withdrawn without interruption as long as the apparatus is in use and that such evacuation does not necessitate the utilization of any moving parts. On the other hand, mechanical evacuation, especially if coupled with pneumatic separation of intercepted solid material from the external surfaces 31 of the walls 51, greatly enhances the likelihood of complete removal of intercepted solid material even if such solid material exhibits a pronounced tendency to adhere to the walls 51. It is often preferred to resort to combined pneumatic and mechanical evacuation of intercepted solid fraction, e.g., in a manner as shown in FIG. 12.

Thorough cleaning of successive increments of walls 51 during travel past the stationary receptacles 21-is ensured in one or more different ways. Thus, in accordance with a first procedure, suction in the compartments 36, together with the separating action of lips 35 of the stripping elements 34 and with the separating action of the cones 32, suffices to ensure separation of intercepted solid material from the respective external surfaces 31 and advancement of separated solid material into and thereupon out of the respective compartments 36. In addition, sprays of liquid issuing from the nozzles 62 can enhance separation of intercepted solid material from the respective walls 51. Still further, the liquid which is discharged from the passage 60 in the carrier 12 can flush solid material from the pores and/or interstices of the walls 51 to even further enhance the cleaning action. The provision of two or more inlets 44 and/or one or more inlets 44 and at least one inlet 45 for each wall 51 also promotes reliable separation of intercepted solid material. The relatively small amounts of liquid which enter the compartments 36 facilitate the evacuation of solid material from the compartments 36 through the outlets 40 of the respective receptacles 21.

An important advantage of the improved filtering apparatus is that it can process large quantities of a mixture of solid and liquid fractions per unit of time. This is due to the fact the major portion of each foraminous wall 51 is in use at all times to segregate the solid fraction from the liquid fraction. Thus, with the exception of that portion of a wall 51 which happens to move past the respective receptacle 21, the entire remaining portion of such wall is immersed in the mixture which fills the vessel 11 and can be used to segregate the solid fraction from the liquid fraction. The vessel 11 can be completely filled with a mixture of solid and liquid fractions. The term "completely filled" is intended to embrace filling of the vessel 11 to such an extent that the entire foraminous walls 51 of the filters 28 are immersed in the mixture in the internal space 17 of the vessel.

Another important advantage of the improved apparatus is the ability of the receptacles 21 to ensure thorough and repeated cleaning of the walls 51 so that all portions of the walls which are not adjacent the respective receptacles are capable of permitting liquid fraction to flow therethrough and into the chambers 29 of the corresponding filters 28.

The ability of the receptacles 21 and of the devices which are mounted on and in such receptacles to reliably withdraw the intercepted solid fraction is not affected by the fact that the receptacles 21 are fully immersed in the mixture which fills the internal space 17 of the vessel 11. Thus, the aforediscussed sealing means (such as the cones 32 and the sealing or stripping elements 34, 69) render it possible to prevent the unfiltered mixture from contacting the intercepted solid fraction which is in the process of being separated from the external surfaces 31 of the respective foraminous walls 51. The provision of inlets 44 and/or 45 which extend all the way between the radially innermost and radially outermost portions of the adjacent walls 51 ensures that the intercepted solid fraction can be removed from the entire external surface 31 of the adjacent wall 51 once during each revolution of the respective filter 28.

The improved filtering apparatus is susceptible of numerous additional modifications without departing from the spirit of the invention. For example, feed screws of the type shown at 39 in FIG. 12 can serve the additional function of expelling remaining liquid fraction from the intercepted solid fraction. Such feed screws can be replaced with belt conveyors carrying scrapers or the like to promote the advancement of intercepted solid fraction toward and into the outlets 40 of the respective receptacles 21. The prime mover 13 and the transmission 27 can be replaced with other suitable means for driving the carrier 12 at one or more selected speeds, and the vessel 11 need not be provided with a cylindrical wall member 19.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for continuously filtering a mixture of a liquid fraction and a solid fraction, comprising a mixture-containing vessel; a driven elongated rotary carrier mounted in said vessel; a plurality of neighboring filters provided on and rotatable with said carrier and spaced apart from each other in the longitudinal direction of said carrier, each of said filters having at least one foraminous wall which intercepts the solid fraction but is permeable to the liquid fraction and at least one internal chamber for the liquid fraction adjacent said at least one wall; means for evacuating the liquid fraction from said chambers and for establishing a pressure differential between the mixture in said vessel and said chambers so that the liquid fraction of the mixture flows through said walls into the respective chambers and the solid fraction is intercepted by said walls; and means for removing the intercepted solid fraction from said walls, including a plurality of stationary receptacles in said vessel, at least one for each of said walls and each having an internal compartment for the solid fraction, means for at least partially sealing the compartment from the mixture in said vessel and means for directing the intercepted solid fraction from the respective wall into the compartment, said sealing means comprising a rotary element provided on each of said receptacles and engaging the respective wall, and a stripping element provided on each receptacle, spaced apart from the respective rotary element and engaging the respective wall to strip the solid fraction from said wall, said directing means comprising an inlet provided between the stripping element and the rotary element on each receptacle and communicating with the respective compartment.

2. The apparatus of claim 1, wherein each of said filters includes a substantially disc-shaped body having two spaced apart foraminous walls extending substantially radially of said carrier, flanking the respective chamber and having radially innermost portions at said carrier and radially outermost portions remote from said carrier, said evacuating means including said carrier.

3. The apparatus of claim 1, wherein said carrier is rotatable about a substantially horizontal axis and said walls are disposed in substantially vertical planes, said receptacles being at least partially submerged in the mixture within said vessel.

4. The apparatus of claim 3, wherein said vessel comprises a cylindrical wall member which is at least substantially coaxial with and spacedly surrounds said carrier, and two end wall members flanking said cylindrical wall member, said carrier being sealingly journalled in at least one of said end wall members.

5. The apparatus of claim 1, wherein said carrier is rotatable in a predetermined direction and said walls are disposed in planes at least substantially normal to the axis of rotation of said carrier, said walls having external surfaces adjacent the respective receptacles and each of said receptacles including a front part and a rear part, as seen in said direction, said sealing means including stripping elements at the rear parts of the respective receptacles, said stripping elements having sealing lips confronting the front parts of the respective receptacles and bearing against the external surfaces of the respective walls to separate the intercepted solid fraction therefrom.

6. The apparatus of claim 5, wherein at least the sealing lip of each of said stripping elements consists of an elastomeric material.

7. The apparatus of claim 1, wherein said removing means comprises means for pneumatically withdrawing solid fractions from said compartments.

8. The apparatus of claim 1, wherein said removing means includes means for mechanically withdrawing solid fractions from said compartments.

9. The apparatus of claim 1, wherein said filters and the respective receptacles define paths for the flow of some liquid fraction from said chambers into the respective compartments.

10. The apparatus of claim 1, further comprising means for supplying the mixture into said vessel at an elevated pressure above that of the liquid fraction in said chambers.

11. The apparatus of claim it further comprising means for adjusting the pressure differential between the mixture in said vessel and the liquid fractions in said chambers.

12. The apparatus of claim 11, wherein said evacuating means includes a channel which is provided in said carrier and receives liquid fraction from said chambers, said adjusting means comprising a valve having means for regulating the flow of liquid fraction in said channel.

* * * * *